US011924867B2

United States Patent
Tidestav et al.

(10) Patent No.: US 11,924,867 B2
(45) Date of Patent: Mar. 5, 2024

(54) EFFICIENT SIGNALING OF RATE MATCHING PATTERNS

(71) Applicant: Telefonaktiebolaget LM Ericsson (publ), Stockholm (SE)

(72) Inventors: Claes Tidestav, Bålsta (SE); Mattias Frenne, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 386 days.

(21) Appl. No.: 17/430,211

(22) PCT Filed: Dec. 9, 2019

(86) PCT No.: PCT/SE2019/051251
§ 371 (c)(1),
(2) Date: Aug. 11, 2021

(87) PCT Pub. No.: WO2020/167184
PCT Pub. Date: Aug. 20, 2020

(65) Prior Publication Data
US 2022/0167367 A1    May 26, 2022

Related U.S. Application Data

(60) Provisional application No. 62/806,320, filed on Feb. 15, 2019.

(51) Int. Cl.
*H04L 1/00* (2006.01)
*H04L 5/00* (2006.01)
(Continued)

(52) U.S. Cl.
CPC ........... *H04W 72/54* (2023.01); *H04L 1/0067* (2013.01); *H04L 5/0051* (2013.01); *H04W 72/1263* (2013.01)

(58) Field of Classification Search
CPC ............... H04L 1/0067; H04L 5/0051; H04W 72/1263; H04W 72/54
See application file for complete search history.

(56) References Cited

U.S. PATENT DOCUMENTS

| 8,902,842 | B1 | 12/2014 | Gomadam et al. |
| 9,591,632 | B2 | 3/2017 | Yi et al. |

FOREIGN PATENT DOCUMENTS

| EP | 2819314 A1 | 12/2014 |
| EP | 2819314 B1 | 11/2016 |

OTHER PUBLICATIONS

International Search Report and Written Opinion dated Feb. 25, 2020 for International Application No. PCT/SE2019/051251 filed Dec. 9, 2019, consisting of 14-pages.
(Continued)

*Primary Examiner* — Brian P Cox
(74) *Attorney, Agent, or Firm* — Christopher & Weisberg, P.A.

(57) ABSTRACT

A method, network node and wireless device for efficient signaling of rate matching patterns are disclosed. According to one aspect, a network node is configured to indicate to a wireless device whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal; and transmit signaling according to the PDSCH-to-RE mapping, the PDSCH being one of mapped and not mapped to the at least one RE associated with the reference signal based on the indication. According to another aspect, a wireless device is configured to receive the indication from the network node; and receive the PDSCH based on the indication.

20 Claims, 10 Drawing Sheets

(51) Int. Cl.
*H04W 72/1263* (2023.01)
*H04W 72/54* (2023.01)

(56) References Cited

OTHER PUBLICATIONS

3GPP TS 38.214 V15.4.0; 3rd Generation Partnership Project: Technical Specification Group Radio Access Network; NR; Physical layer procedures for data (Release 15), Dec. 2018, consisting of 102-pages.

3GPP TSG RAN WG1 Meeting NR#3 R1-1715511; Title: On DL RS multiplexing; Agenda Item: 6.2.3.1; Source: Spreadtrum Communications; Document for: Discussion and decision; Date and Location: Sep. 18-21, 2017, Nagoya, Japan, consisting of 7-pages.

3GPP TSG-RAN WG1 #95 R1-1813592; Title: RAT dependent NR positioning solutions; Agenda Item: 7.2.10.3; Source: Ericsson; Document for: Discussion, Decision; Date and Location: Nov. 12-16, 2018, Spokane, United States, consisting of 17-pages.

3GPP TSG-RAN WG1 Meeting #96 Tdoc R1-19xxxxx; Title: Enhancements to multi-beam operation; Agenda Item: 7.2.8.3; Source: SEricsson; Document for: Discussion, Decision; Date and Location: Feb. 25-Mar. 1, 2019, Athens, Greece, consisting of 16-pages.

3GPP TS 38.331 V15.3.0; 3rd Generation Partnership Project: Technical Specification Group Radio Access Network; NR; Radio Resource Control (RRC) protocol specification (Release 15), Sep. 2018, consisting of 445-pages.

EPO Communication Intention to Grant dated Jan. 12, 2022 for Patent Application No. 19821309.2, consisting of 6-pages.

3GPP TSG-WG1 Meeting #96bis Tdoc R1-1905156; Title: Enhancements to multi-beam operation; Agenda Item: 7.2.8.3; Source: Ericsson; Document for: Discussion, Decision; Date and Location: Apr. 8-12, 2019, Xi'an, China, consisting of 16-pages.

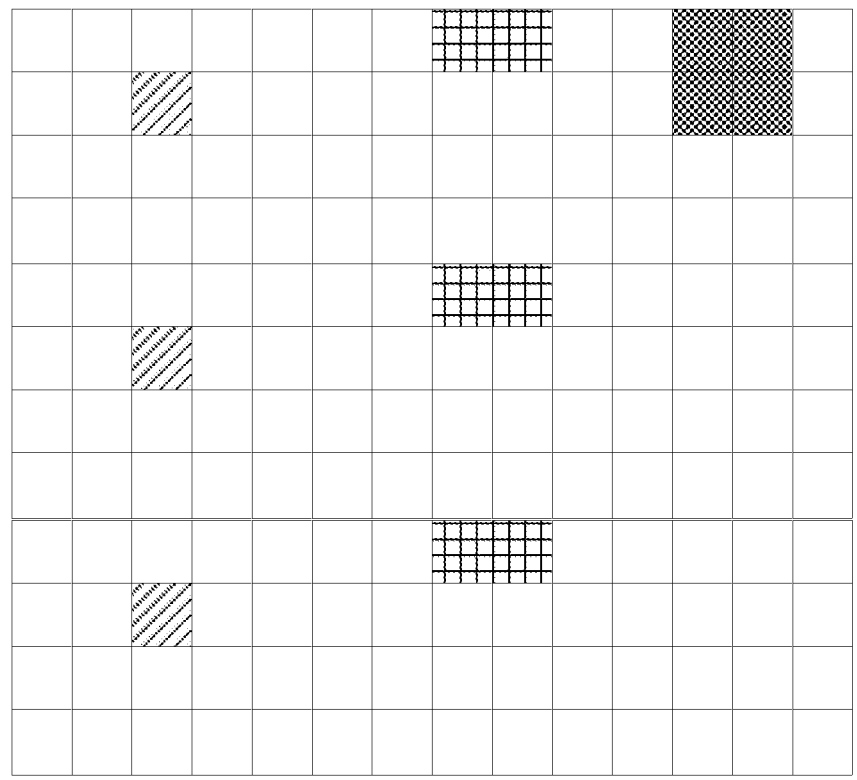
 Data to WD1
 RS to WD1
 RS to WD2
 RS to WD3
FIG. 1

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |
| 0 | 1 | 2 | 3 | 4 | 5 | 6 | 7 | 8 | 9 | 10 | 11 | 12 | 13 |

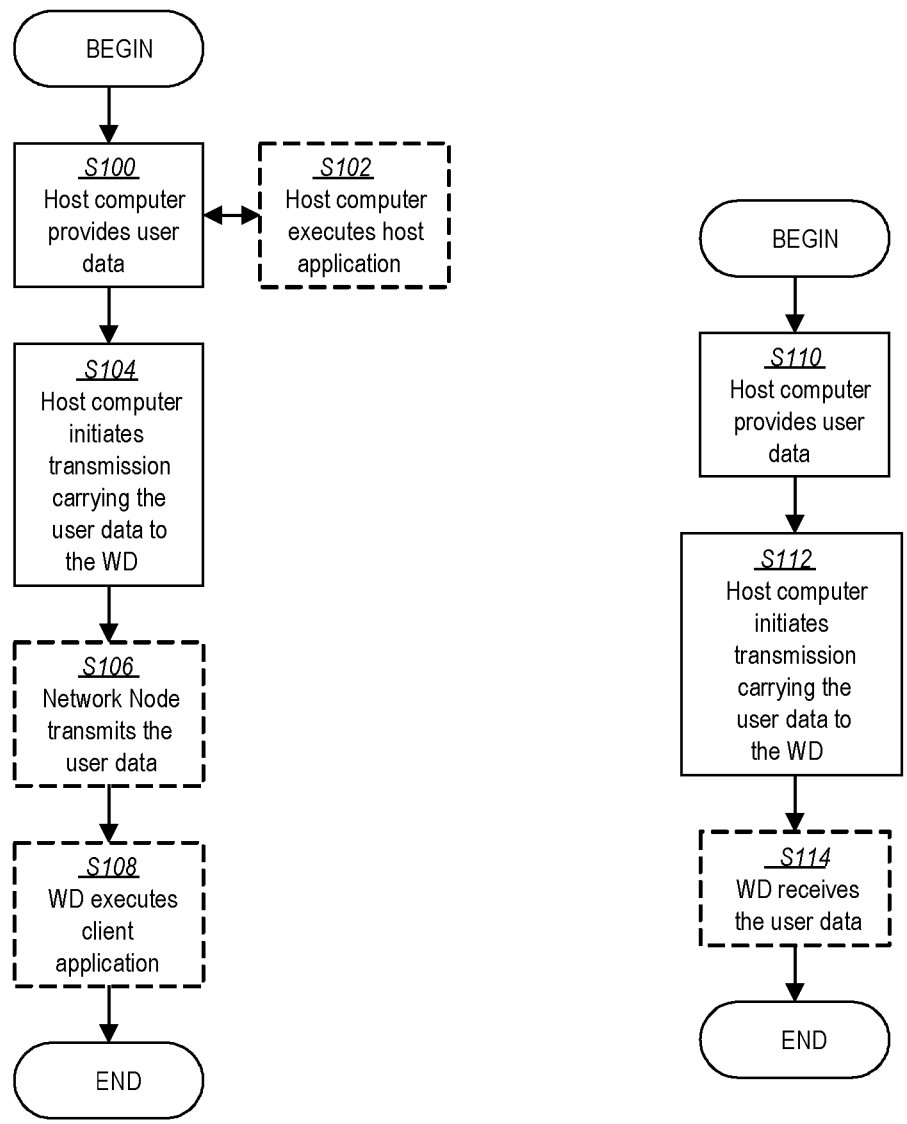

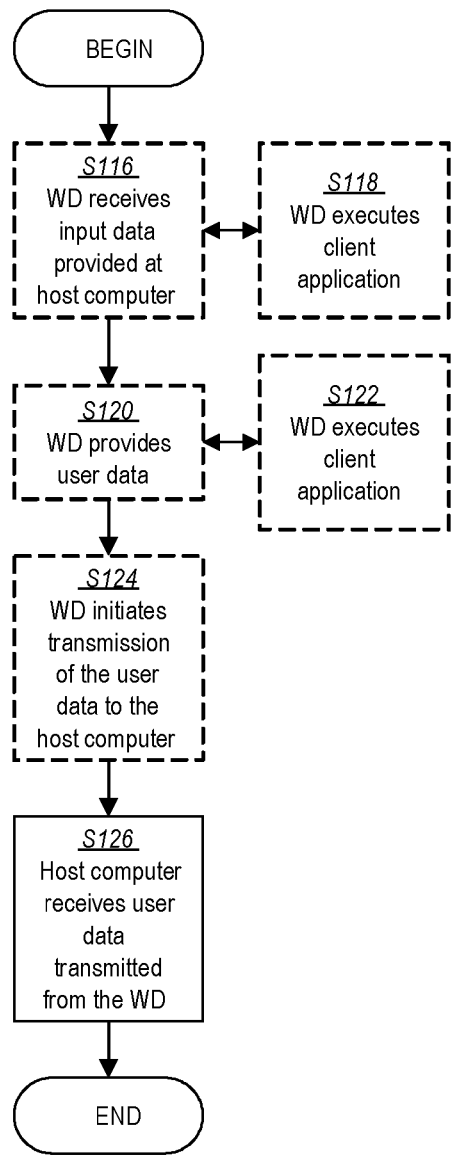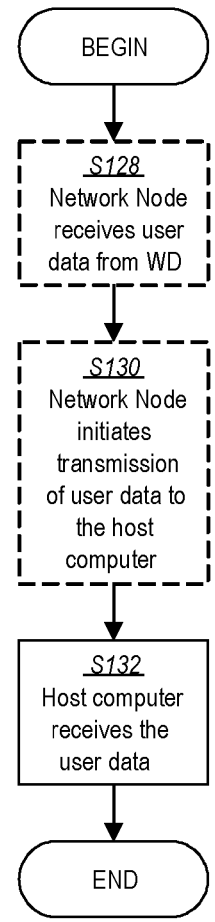
FIG. 8
FIG. 9

EFFICIENT SIGNALING OF RATE MATCHING PATTERNS

CROSS-REFERENCE TO RELATED APPLICATIONS

This application is a Submission Under 35 U.S.C. § 371 for U.S. National Stage Patent Application of International Application No.: PCT/SE2019/051251, filed Dec. 9, 2019 entitled "EFFICIENT SIGNALING OF RATE MATCHING PATTERNS," which claims priority to U. S. Provisional Application No.: 62/806,320, filed Feb. 15, 2019, entitled "EFFICIENT SIGNALING OF RATE MATCHING PATTERNS," the entireties of both of which are incorporated herein by reference.

TECHNICAL FIELD

The present disclosure relates to wireless communications, and in particular, to signaling of rate matching patterns.

BACKGROUND

Rate Matching

A wireless device (WD) is typically scheduled to receive data in a contiguous time-frequency range, i.e., for a certain period of time (e.g., a slot) and a certain frequency range (e.g., over one or multiple physical resource blocks (PRBs) where one resource block (RB) is 12 subcarriers). However, in many cases, all of the resources in this contiguous time-frequency range cannot be reserved for data to one WD. It is common that some of the resources are occupied by reference signals to either the scheduled WD or to other WDs. This situation is depicted in FIG. 1 which shows an example of a resource element grid, where some of the resource elements are occupied by data to WD1, whereas other resource elements are occupied by reference signals to different, other WDs.

To decode the data, the network node (base station) transmitter and the receiving WD should know which resource elements (REs) contain data and which REs do not in order to make a proper physical downlink shared channel (PDSCH)-to-RE mapping at the transmitter and corresponding de-mapping at the receiver. This is achieved by the WD applying so called rate-matching when mapping the PDSCH (or in general, any other downlink physical channel), which means that the WD is informed which REs do not contain data but may contain something else.

The scheduled WD knows which REs contain reference signals it has been configured with (otherwise it cannot use the reference signals for measurements), and then it is in many cases stated in the standard that the WD can assume that there is no data in these REs. In Third Generation Partnership Project (3GPP) New Radio (NR) (also referred to as "5G"), this holds for periodic non-zero power (NZP) channel state information reference signals (CSI-RS). An exception is aperiodic NZP CSI-RS, which the WD should not assume the PDSCH is rate matched around. However, when such aperiodic reference signals are triggered, the network can configure a zero power (ZP) CSI-RS that overlaps with the periodic NZP CSI-RS and hence, the PDSCH will be rate matched around the ZP CSI-RS, effectively creating a rate matching around aperiodic NZP CSI-RS.

To inform the WD about REs that are unavailable for data due to other factors, such as reference signals intended for other WDs, the network (NW) configures the WD with specific rate-matching patterns. The rate-matching patterns essentially provide the WD with 2-dimensional bitmaps that indicate which REs are unavailable for data. The WD then combines information about the reference signal transmissions it is aware of, with the explicitly signaled rate-matching patterns.

PDSCH Resource Mapping

In NR, a virtual circular buffer is used to match any available code rate by selecting or pruning bits in the buffer. This rate matching is useful since the number of available REs for a WD in a slot may vary due to the presence or absence of various control channel signals, reserved resources or reference signals. For example, the number of REs for PDSCH in a subframe configured with CSI-RS would be different from that in subframes without CSI-RS. The rate matching can be used to adapt the variations of the available PDSCH REs in this case for a scheduled resource of one or multiple resources blocks and between two to fourteen orthogonal frequency division multiplexed (OFDM) symbols. Note that in this case, both the gNB (NW base station) and the WD know the exact number of available PDSCH REs and the RE locations in an RB and in the scheduled resources. This PDSCH-to-RE mapping information may be useful for correct PDSCH decoding as otherwise, there could be a mismatch between the REs on which a PDSCH is transmitted by the network node and the REs over which the PDSCH is received and decoded by the wireless device. Note that in this disclosure, the phrases 'PDSCH resource mapping' and 'PDSCH rate matching' are used alternatingly/interchangeably.

PDSCH Resource Mapping with RB Symbol Level Granularity

NR Standard Release-15 supports rate matching patterns (resources not available for PDSCH to RE mapping) with RB and symbol level granularity that can be used for PDSCH resource mapping. When a WD is configured with such a rate matching pattern, the REs included in that rate matching pattern are declared as unavailable for PDSCH. In NR Release-15, a rate matching pattern with RB and symbol level granularity is configured by the network to the WD via higher layer parameter RateMatchPattern.

A list, rateMatchPatternToAddModList, of RateMatchPattern(s) can be given in a configuration by PDSCH-Config or by ServingCellConfigCommon. When rateMatchPatternToAddModList is given by PDSCH-Config configuration, it is defined on a bandwidth part (BWP) level, i.e., within a BWP. When rateMatchPatternToAddModList is given by ServingCellConfigCommon, it is defined on a serving cell level, i.e., regardless of BWP configuration. Up to 4 RateMatchPattern(s) can be defined on a BWP level to a WD, and up to 4 RateMatchPattern(s) can be defined on a cell level (common to all WDs served by the cell). The RateMatchPattern, PDSCH-Config and ServingCellConfigCommon information elements as specified in the Third Generation Partnership Project (3GPP) Technical Standard (TS) 38.331 V15.3.0 are shown below.

| RateMatchPattern Information Element |
| --- |

```
-- ASN1START
-- TAG-RATEMATCHPATTERN-START
RateMatchPattern ::=         SEQUENCE {
  rateMatchPatternId         RateMatchPatternId,
  patternType                CHOICE {
    bitmaps                  SEQUENCE {
      resourceBlocks                  BIT STRING (SIZE (275)),
      symbolsInResourceBlock          CHOICE {
        oneSlot                       BIT STRING (SIZE (14)),
        twoSlots                      BIT STRING (SIZE (28))
      },
      periodicityAndPattern           CHOICE {
        n2                   BIT STRING (SIZE (2)),
        n4                   BIT STRING (SIZE (4)),
        n5                   BIT STRING (SIZE (5)),
        n8                   BIT STRING (SIZE (8)),
        n10                    BIT STRING (SIZE (10)),
        n20                    BIT STRING (SIZE (20)),
        n40                    BIT STRING (SIZE (40))
      }                                     OPTIONAL,  -- Need S
      ...
    },
    controlResourceSet                ControlResourceSetId
  },
  subcarrierSpacing          SubcarrierSpacing           OPTIONAL,  --
Cond CellLevel
  dummy                ENUMERATED { dynamic, semiStatic },
  ...
}
-- TAG-RATEMATCHPATTERN-STOP
-- ASN1STOP
```

| PDSCH-Config Information Element |
| --- |

```
-- ASN1START
-- TAG-PDSCH-CONFIG-START
PDSCH-Config ::=           SEQUENCE {
  dataScramblingIdentityPDSCH        INTEGER (0..1023)
OPTIONAL,  -- Need S
  dmrs-DownlinkForPDSCH-MappingTypeA     SetupRelease { DMRS-
DownlinkConfig }     OPTIONAL,  -- Need M
  dmrs-DownlinkForPDSCH-MappingTypeB     SetupRelease { DMRS-
DownlinkConfig }     OPTIONAL,  -- Need M
  tci-StatesToAddModList     SEQUENCE (SIZE(1..maxNrofTCI-States)) OF
TCI-State OPTIONAL,   -- Need N
  tci-StatesToReleaseList    SEQUENCE (SIZE(1..maxNrofTCI-States)) OF TCI-
StateId OPTIONAL, -- Need N
  vrb-ToPRB-Interleaver     ENUMERATED {n2, n4}             OPTIONAL,
-- Need S
  resourceAllocation    ENUMERATED { resourceAllocationType0,
resourceAllocationType1, dynamic Switch},
  pdsch-TimeDomainAllocationList SetupRelease {PDSCH-
TimeDomainResourceAllocationList} OPTIONAL,-- Need M
  pdsch-AggregationFactor     ENUMERATED { n2, n4, n8 }
OPTIONAL,   -- Need S
  rateMatchPatternToAddModList      SEQUENCE (SIZE
(1..maxNrofRateMatchPatterns)) OF RateMatchPattern    OPTIONAL,  -- Need N
  rateMatchPatternToReleaseList     SEQUENCE (SIZE
(1..maxNrofRateMatchPatterns)) OF RateMatchPatternId    OPTIONAL,  -- Need N
  rateMatchPatternGroup1      RateMatchPatternGroup     OPTIONAL,  --
Need R
  rateMatchPatternGroup2      RateMatchPatternGroup     OPTIONAL,  --
Need R
  rbg-Size               ENUMERATED {config1, config2},
  mcs-Table              ENUMERATED {qam256, qam64LowSE}
OPTIONAL,  -- Need S
  maxNrofCodeWordsScheduledByDCI        ENUMERATED {n1, n2}
OPTIONAL,  -- Need R
  prb-BundlingType          CHOICE {
    staticBundling          SEQUENCE {
      bundleSize            ENUMERATED { n4, wideband }
OPTIONAL   -- Need S
    },
    dynamicBundling         SEQUENCE {
      bundleSizeSet1     ENUMERATED { n4, wideband, n2-wideband, n4-
```

| PDSCH-Config Information Element |
|---|

```
wideband } OPTIONAL, -- Need S
        bundleSizeSet2        ENUMERATED { n4, wideband }
OPTIONAL     -- Need S
    }
  },
  zp-CSI-RS-ResourceToAddModList          SEQUENCE (SIZE
(1..maxNrofZP-CSI-RS-Resources)) OF ZP-CSI-RS-Resource     OPTIONAL, --
Need N
  zp-CSI-RS-ResourceToReleaseList          SEQUENCE (SIZE (1..maxNrofZP-
CSI-RS-Resources)) OF ZP-CSI-RS-ResourceId   OPTIONAL, -- Need N
  aperiodic-ZP-CSI-RS-ResourceSetsToAddModList    SEQUENCE (SIZE
(1..maxNrofZP-CSI-RS-ResourceSets)) OF ZP-CSI-RS-ResourceSet OPTIONAL, --
Need N
  aperiodic-ZP-CSI-RS-ResourceSetsToReleaseList   SEQUENCE (SIZE
(1..maxNrofZP-CSI-RS-ResourceSets)) OF ZP-CSI-RS-ResourceSetId   OPTIONAL,
- NeedN
  sp-ZP-CSI-RS-ResourceSetsToAddModList   SEQUENCE (SIZE (1..maxNrofZP-
CSI-RS-ResourceSets)) OF ZP-CSI-RS-ResourceSet          OPTIONAL,  -- Need N
  sp-ZP-CSI-RS-ResourceSetsToReleaseList SEQUENCE (SIZE (1..maxNrofZP-
CSI-RS-ResourceSets)) OF ZP-CSI-RS-ResourceSetId        OPTIONAL,  -- Need N
  p-ZP-CSI-RS-ResourceSet         SetupRelease { ZP-CSI-RS-ResourceSet }
OPTIONAL,    -- Need M
  ...
}
RateMatchPatternGroup ::=          SEQUENCE (SIZE
(1..maxNrofRateMatchPatternsPerGroup)) OF CHOICE {
  cellLevel              RateMatchPatternId,
  bwpLevel               RateMatchPatternId
}
-- TAG-PDSCH-CONFIG-STOP
-- ASN1STOP
```

| ServingCellConfigCommon Information Element |
|---|

```
-- ASN1START
-- TAG-SERVING-CELL-CONFIG-COMMON-START
ServingCellConfigCommon ::=     SEQUENCE {
  physCellId         PhysCellId                      OPTIONAL,
-- Cond HOAndServCellAdd,
  downlinkConfigCommon         DownlinkConfigCommon
OPTIONAL,   -- Cond HOAndServCellAdd
  uplinkConfigCommon         UplinkConfigCommon
OPTIONAL,    -- Need M
  supplementaryUplinkConfig         UplinkConfigCommon
OPTIONAL,    -- Need S
  n-TimingAdvanceOffset        ENUMERATED { n0, n25600, n39936 }
OPTIONAL,    -- Need S
  ssb-PositionsInBurst         CHOICE {
    shortBitmap            BIT STRING (SIZE (4)),
    mediumBitmap             BIT STRING (SIZE (8)),
    longBitmap           BIT STRING (SIZE (64))
  }                                              OPTIONAL,  -
- Cond AbsFreqSSB
  ssb-periodicityServingCell       ENUMERATED { ms5, ms10, ms20, ms40,
ms80, ms160, spare2, spare1 }     OPTIONAL,   -- Need S
  dmrs-TypeA-Position       ENUMERATED {pos2, pos3},
    lte-CRS-ToMatchAround       SetupRelease { RateMatchPatternLTE-CRS }
OPTIONAL,   -- Need M
  rateMatchPatternToAddModList      SEQUENCE (SIZE
(1..maxNrofRateMatchPatterns)) OF RateMatchPattern    OPTIONAL,   -- Need N
  rateMatchPatternToReleaseList     SEQUENCE (SIZE
(1..maxNrofRateMatchPatterns)) OF RateMatchPatternId     OPTIONAL,   -- Need N
  subcarrierSpacing          SubcarrierSpacing
```

| ServingCellConfigCommon Information Element |
| --- |

```
OPTIONAL,  -- Cond HOAndServCellAdd
    tdd-UL-DL-ConfigurationCommon      TDD-UL-DL-ConfigCommon
OPTIONAL,  -- Cond TDD
    ss-PBCH-BlockPower          INTEGER (-60..50),
    ...
}
-- TAG-SERVING-CELL-CONFIG-COMMON-STOP
-- ASN1STOP
```

Each RateMatchPattern can be defined in one of two following approaches:

In the first approach, bitmaps may be defined including bitmaps 'resourceBlocks', 'symbolsInResourceBlock', and 'periodicityAndPattern'. The first bitmap 'resourceBlocks' defines the rate matching pattern in the frequency domain. When a bit in 'resourceBlocks' is set to 1, the WD may apply rate matching in the corresponding RB in accordance with the 'symbolsInResourceBlock' bitmap. The second bitmap 'symbolsInResourceBlock' defines the rate matching pattern in the time domain across one or two slots. When a bit in 'symbolsInResourceBlock' is set to true, the WD may rate match around the corresponding symbol. The two bitmaps 'resourceBlocks' and 'symbolsInResourceBlock' together define the frequency-time rate matching pattern within one or two slots. Hence, if an RB is included by the first parameter then the symbols as indicated by the second parameters are not available for PDSCH-to-RE mapping. The third bitmap 'periodicityAndPattern' defines a time domain repetition pattern (on a slot level) at which the frequency-time rate matching pattern defined by 'resourceBlocks' and 'symbolsInResourceBlock' recurs. If the third bitmap 'periodicityAndPattern' is absent, then the frequency-time rate matching pattern defined by 'resourceBlocks' and 'symbolsInResourceBlock' recurs either every slot or every two slots.

In the second approach, an entire control resource set (CORESET) is used as the rate matching pattern such that the PDSCH reception is rate matched around the CORESET together with two additional higher layer parameters, given by the search space associated with the CORESET, that defines the OFDM symbols within the slot for the CORESET and the slot level periodicity. An ID of the CORESET to be used as the rate matching pattern for the PDSCH is defined by the 'controlResourceSet' parameter in the information element RateMatchPattern.

As part of the PDSCH-Config information element (IE), one or two rate matching groups can be configured via higher layer parameters rateMatchPatternGroup1 and rateMatchPatternGroup2. These groups contain a list of RateMatchPattern identifiers and up to 8 RateMatchPattern identifiers can be configured in each group. One or both of these groups can be dynamically indicated for PDSCH resource mapping (i.e., rate matching) via the 'Rate matching indicator' field in downlink control information (DCI) format 1_1. When indicated, the included REs are not available for the PDSCH to RE mapping for the scheduled PDSCH.

The 1$^{st}$ bit (if present) in the 'Rate matching indicator' field is used to indicate rateMatchPatternGroup1, and the 2$^{nd}$ bit (if present) in the 'Rate matching indicator' field is used to indicate rateMatchPatternGroup2.

If rateMatchPatternGroup1 is indicated in the DCI, then the union of the RateMatchPatterns indicated via rateMatchPatternGroup1 is used for the purposes of PDSCH resource mapping. That is, any RE that is included in at least one of the RateMatchPatterns in rateMatchPatternGroup1 is declared as unavailable for the PDSCH-to-RE mapping scheduled by the DCI that indicates rateMatchPatternGroup1;

If rateMatchPatternGroup2 is indicated in the DCI, then the union of the RateMatchPatterns indicated via rateMatchPatternGroup2 is used for the purposes of PDSCH resource mapping. That is, any RE that is included in at least one of the RateMatchPatterns in rateMatchPatternGroup2 is declared as unavailable for the PDSCH-to-RE mapping scheduled by the DCI that indicates rateMatchPatternGroup2;

If both rateMatchPatternGroup1 and rateMatchPatternGroup2 are indicated in the DCI, then the union of the RateMatchPatterns indicated via both rateMatchPatternGroup1 and rateMatchPatternGroup2 is used for the purposes of PDSCH resource mapping. That is, any RE that is included in at least one of the RateMatchPatterns in either rateMatchPatternGroup1 or rateMatchPatternGroup2 is declared as unavailable for the PDSCH to RE mapping scheduled by the DCI that indicates both rateMatchPatternGroup1 and rateMatchPatternGroup2.

If the 'Rate matching indicator' field contains 0 bits (i.e., 'Rate matching indicator' field is absent), this corresponds to the case that neither rateMatchPatternGroup1 nor rateMatchPatternGroup2 is indicated via the DCI.

PDSCH Resource Mapping with RE Level Granularity

In the 3$^{rd}$ Generation Partnership (3GPP) NR Release-15, one of the ways to configure PDSCH resource mapping with RE level granularity is to configure Zero-Power (ZP) CSI-RS resources to the WDs. As its name implies, the WD may not assume that the gNB transmits PDSCH on the REs occupied by the ZP CSI-RS configured to the WD. That is, the PDSCH of the WD may be rate matched around the ZP CSI-RS resources. ZP CSI-RS resources may be configured to the WDs for three purposes. First, ZP CSI-RS can be configured to a WD in order to protect NZP (non-zero power) CSI-RS transmissions from one or more neighboring cells. Second, ZP CSI-RS can be used for the purposes of indicating whether or not the PDSCH is mapped to CSI-IM. Third, (aperiodic) ZP CSI-RS can be used to indicate that the WD may rate match its PDSCH around a (potentially beamformed) NZP CSI-RS intended for the WD or another WD to measure upon. It is mainly for the second and third purpose the aperiodic ZP CSI-RS field in the downlink (DL) DCI is employed. As used herein, the downlink (DL) refers to signaling from the network node to the WD, whereas the uplink (UL) refers to signaling from the WD to the network node.

In a typical use case, the network will not transmit anything on the REs occupied by the CSI Interference Measurement (CSI-IM), so the WD can measure the inter-cell interference thereon. To indicate that the PDSCH is not mapped to the REs occupied by the CSI-IM, ZP CSI-RS is typically configured to overlap with the CSI-IM. As the CSI-IM and ZP CSI-RS resources typically overlap, the CSI-IM is colloquially referred to as a ZP CSI-RS based interference measurement resource (IMR). The IMR can be aperiodic (AP IMR), semi-persistent (SP IMR) or periodic IMR (P IMR). Note that in NR, an NZP CSI-RS can also be configured as an IMR. In Release-15, NR supports aperiodic ZP CSI-RS (AP ZP CSI-RS), semi-persistent ZP CSI-RS (SP ZP CSI-RS) and periodic ZP CSI-RS (P ZP CSI-RS).

Within a BWP, a WD can be configured with one or more ZP CSI-RS resource sets given by higher layer parameter ZP-CSI-RS-ResourceToAddModList contained in the PDSCH-Config information element.

The higher layer parameter zp-CSI-RS-ResourceToAdd-ModList consists of one or more ZP-CSI-RS-Resource-Set(s). Each ZP-CSI-RS-ResourceSet can consist of at most 16 ZP CSI-RS resources.

In NR Release-15, the WD may be configured with higher layer parameter aperiodic-ZP-CSI-RS-ResourceSetsToAdd-ModList consisting of a list of ZP-CSI-RS-ResourceSet(s) which can be triggered aperiodically. The maximum number of ZP-CSI-RS-ResourceSet(s) in this list is 3, and the number of bits in the DCI field 'ZP CSI-RS trigger' depends on the exact number of ZP-CSI-RS-ResourceSet(s) in this list. Each non-zero codepoint in the 'ZP CSI-RS trigger' field in the DCI is used to trigger one of the ZP-CSI-RS-ResourceSet in aperiodic-ZP-CSI-RS-ResourceSetsToAdd-ModList. The zero codepoint (i.e., the value '0' or '00') of 'ZP CSI-RS trigger' field is used to indicate no aperiodic triggering of ZP CSI-RS. Any RE that is included in the ZP-CSI-RS resources included in the ZP-CSI-RS-Resource-Set indicated by the DCI is not available for the PDSCH scheduled by the DCI that indicates ZP-CSI-RS-Resource-Set.

For the PDSCH to RE mapping, with RE level granularity, the parameter lte-CRS-ToMatchAround in ServingCell-ConfigCommon can be configured to indicate the presence of a Long Term Evolution (LTE) reference signal, the common RS. The RE indicated by this parameter is thus not available for PDSCH-to-RE mapping Comb Structure of NZP CSI-RS In some use cases of NZP CSI-RS, such as when used for tracking reference signals (TRS), and when used for beam management, the NZP CSI-RS is mapped on a comb structure, that is repeated on every $n^{th}$ subcarrier within an OFDM symbol. See FIG. 2 for an example of a TRS mapped to symbol index 4 and 8 in the slot and so on to every $4^{th}$ subcarrier. Hence, for TRS, n=4, by applying four different frequency offsets {0,1,2,3}, each OFDM symbol can carry four different TRSs. Likewise for beam management, if the same structure is applied, and the REs in between are empty, (i.e., one used element, three empty, one used, three empty and so on) then this corresponds to a repetitive structure of the time domain waveform with n repetitions. This provides the WD with a possibility to try n different receive (RX) beams, within one OFDM symbol, hence speeding up the RX beam training by n times. This is known in the Third Generation Partnership Project (3GPP) as interleaved frequency division multiple access (IFDMA). FIG. 2 shows a portion of an example of a NZP CSI-RS configured as a TRS with a comb structure.

For reference signals with a structure that includes a mix of resource elements that are occupied and unoccupied, the existing signaling of rate-matching parameters is inefficient since many such ZP CSI-RS resources or Long Term Evolution (LTE) CRS resources may be used in order to make interlaced resource elements not available for the PDSCH-to-RE mapping. The WD would by default only rate-match around the REs where the actual reference signal is transmitted. For the WD to rate-match around the REs that are empty, an additional rate matching pattern would be signaled to the WD and the WD only supports a finite small number of such ZP CSI-RS resources that can be used to protect REs that should be empty. In the example given above, if a repetition pattern of n is applied for NZP CSI-RS, then n−1 ZP CSI-RS resources should be configured, per OFDM symbol, in order to keep those REs empty, i.e., to not map the PDSCH to these REs.

SUMMARY

Some embodiments advantageously provide methods, network nodes and wireless devices for a more efficient signaling of rate matching patterns, as compared to existing rate matching patterns.

According to one aspect, a network node is configured to configure a reference signal. The network node is further configured to signal the WD to indicate whether the WD is to assume that remaining associated resource elements, REs, in same orthogonal frequency division multiplex, OFDM, symbols are available or not available for physical downlink shared channel, PDSCH-to-RE mapping based at least in part on REs of the configured reference signal.

Some embodiments introduce an option to signal a rate matching pattern for PDSCH-to-RE mapping that is composed of the REs that are occupied by a reference signal, and additional REs where the reference signal is used for CSI reporting of for channel tracking (i.e., the reference signal is not used for demodulation and is thus not associated directly with the PDSCH that is being mapped to REs). Alternatively, when configuring a NZP CSI-RS, it is indicated whether remaining REs in the occupied symbol should be declared as not available for PDSCH-to-RE mapping.

Some embodiments may enable reduced signaling overhead as compared with other embodiments. Some embodiments enable a possibility to perform rate matching for some sparsely populated OFDM symbols (i.e., with an occupied RE every nth subcarrier) without excessive use of the scarce and limited number of available ZP CSI-RS resources.

According to one aspect of the present disclosure, a method implemented in a network node is provided. The method includes indicating to a wireless device whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal. The method includes transmitting signaling according to the PDSCH-to-RE mapping, the PDSCH being one of mapped and not mapped to the at least one RE associated with the reference signal based on the indication.

In some embodiments of this aspect, transmitting signaling according to the PDSCH-to-RE mapping further includes transmitting the reference signal in the OFDM symbol, the PDSCH being mapped to the at least one RE in the same OFDM symbol as the reference signal if the indication indicates that the at least one RE associated with the reference signal is available for the PDSCH-to-RE mapping, and the PDSCH not being mapped to the at least one RE in the same OFDM symbol as the reference signal if the indication indicates that the at least one RE associated with the reference signal is not available for the PDSCH-to-RE mapping.

In some embodiments of this aspect, the method further includes scheduling the PDSCH in resources that overlap resources for the reference signal including the at least one RE associated with the reference signal. In some embodiments of this aspect, transmitting signaling according to the PDSCH-to-RE mapping further includes transmitting the PDSCH according to the PDSCH-to-RE mapping in which the scheduled PDSCH is one of mapped and not mapped to the at least one RE associated with the reference signal based on the indication. In some embodiments of this aspect, the at least one RE is in a frequency of the PDSCH for the wireless device. In some embodiments of this aspect, the at least one RE is further associated with the reference signal by being in at least one resource block of the reference signal. In some embodiments of this aspect, the reference signal includes one or more of: a reference signal that is not directly associated with a PDSCH transmission; a non-zero power channel state information reference signal, NZP CSI-RS; and an NZP CSI-RS used as a tracking reference signal.

In some embodiments of this aspect, indicating to the wireless device further includes indicating whether the at least one RE associated with the reference signal is one of available and not available for the PDSCH-to-RE mapping in a radio resource control, RRC, signaling. In some embodiments of this aspect, indicating to the wireless device further includes indicating whether the at least one RE associated with the reference signal is one of available and not available for the PDSCH-to-RE mapping in at least one of a medium access control, MAC, control elements, CE, signaling and a downlink control information, DCI. In some embodiments of this aspect, if the PDSCH demodulation reference signal, DMRS, is quasi collocated, QCL, Type D with the reference signal, determine that the at least one RE associated with the reference signal is available for the PDSCH-to-RE mapping; and if the PDSCH DMRS is not QCL Type D with the reference signal, determine that the at least one RE associated with the reference signal is not available for the PDSCH-to-RE mapping.

According to another aspect of the present disclosure, a method implemented in a wireless device is provided. The method includes receiving an indication from a network node, the indication indicating whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal. The method includes receiving the PDSCH based on the indication, the PDSCH being one of mapped and not mapped to the at least one RE associated with the reference signal based on the indication.

In some embodiments of this aspect, receiving the PDSCH based on the indication further includes decoding the PDSCH assuming that the PDSCH is mapped to the at least one RE in the same OFDM symbol as the reference signal if the indication indicates that the at least one RE associated with the reference signal is available for the PDSCH-to-RE mapping; and decoding the PDSCH assuming that the PDSCH is not mapped to the at least one RE in the same OFDM symbol as the reference signal if the indication indicates that the at least one RE associated with the reference signal is not available for the PDSCH-to-RE mapping. In some embodiments of this aspect, receiving the PDSCH based on the indication further includes performing the PDSCH-to-RE mapping using rate-matching around at least one RE of the reference signal; and if the indication indicates that the at least one RE associated with the reference signal is not available for the PDSCH-to-RE mapping, additionally rate-matching around the at least one RE associated with the reference signal that is in the same OFDM symbol as the reference signal and in a frequency of the PDSCH.

In some embodiments of this aspect, the method further includes receiving scheduling of the PDSCH in resources that overlap resources for the reference signal including the at least one RE associated with the reference signal; and receiving the PDSCH based on the indication further includes rate-matching the PDSCH according to the PDSCH-to-RE mapping in which the scheduled PDSCH is one of mapped and not mapped to the at least one RE associated with the reference signal based on the indication. In some embodiments of this aspect, the at least one RE is in a frequency of the PDSCH for the wireless device. In some embodiments of this aspect, the at least one RE is further associated with the reference signal by being in at least one resource block of the reference signal. In some embodiments of this aspect, the reference signal includes one or more of: a reference signal that is not directly associated with a PDSCH transmission; a non-zero power channel state information reference signal, NZP CSI-RS; and an NZP CSI-RS used as a tracking reference signal.

In some embodiments of this aspect, receiving the indication from the network node further includes receiving the indication indicating whether the at least one RE associated with the reference signal is one of available and not available for the PDSCH-to-RE mapping in a radio resource control, RRC, signaling. In some embodiments of this aspect, receiving the indication from the network node further includes receiving the indication indicating whether the at least one RE associated with the reference signal is one of available and not available for the PDSCH-to-RE mapping in at least one of a medium access control, MAC, control elements, CE, signaling and a downlink control information, DCI. In some embodiments of this aspect, the method further includes if the PDSCH demodulation reference signal, DMRS, is quasi collocated, QCL, Type D with the reference signal, determining that the at least one RE associated with the reference signal is available for the PDSCH-to-RE mapping; and if the PDSCH DMRS is not QCL Type D with the reference signal, determining that the at least one RE associated with the reference signal is not available for the PDSCH-to-RE mapping. In some embodiments, receiving the PDSCH based on the indication further includes performing a PDSCH-to-RE mapping based on the indication.

According to another aspect of the present disclosure, a network node configured to communicate with a wireless device is provided. The network node includes processing circuitry. The processing circuitry is configured to cause the network node to indicate to a wireless device whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal. The processing circuitry is configured to cause the network node to transmit signaling according to the PDSCH-to-RE mapping, the PDSCH being one of mapped and not mapped to the at least one RE associated with the reference signal based on the indication.

In some embodiments of this aspect, the processing circuitry is further configured to cause the network node to transmit signaling according to the PDSCH-to-RE mapping by being configured to cause the network node to transmit the reference signal in the OFDM symbol, the PDSCH being mapped to the at least one RE in the same OFDM symbol as the reference signal if the indication indicates that the at least one RE associated with the reference signal is available for the PDSCH-to-RE mapping, and the PDSCH not being mapped to the at least one RE in the same OFDM symbol as the reference signal if the indication indicates that the at least one RE associated with the reference signal is not available for the PDSCH-to-RE mapping.

In some embodiments of this aspect, the processing circuitry is further configured to cause the network node to schedule the PDSCH in resources that overlap resources for the reference signal including the at least one RE associated with the reference signal; and transmit signaling according to the PDSCH-to-RE mapping by being configured to transmit the PDSCH according to the PDSCH-to-RE mapping in which the scheduled PDSCH is one of mapped and not mapped to the at least one RE associated with the reference signal based on the indication. In some embodiments of this aspect, the at least one RE is in a frequency of the PDSCH for the wireless device. In some embodiments of this aspect, the at least one RE is further associated with the reference signal by being in at least one resource block of the reference signal. In some embodiments of this aspect, the reference signal includes one or more of: a reference signal that is not directly associated with a PDSCH transmission; a non-zero power channel state information reference signal, NZP CSI-RS; and an NZP CSI-RS used as a tracking reference signal.

In some embodiments of this aspect, the processing circuitry is further configured to cause the network node to indicate to the wireless device by being configured to cause the network node to indicate whether the at least one RE associated with the reference signal is one of available and not available for the PDSCH-to-RE mapping in a radio resource control, RRC, signaling. In some embodiments of this aspect, the processing circuitry is further configured to cause the network node to indicate to the wireless device by being configured to cause the network node to indicate whether the at least one RE associated with the reference signal is one of available and not available for the PDSCH-to-RE mapping in at least one of a medium access control, MAC, control elements, CE, signaling and a downlink control information, DCI. In some embodiments of this aspect, if the PDSCH demodulation reference signal, DMRS, is quasi collocated, QCL, Type D with the reference signal, determine that the at least one RE associated with the reference signal is available for the PDSCH-to-RE mapping; and if the PDSCH DMRS is not QCL Type D with the reference signal, determine that the at least one RE associated with the reference signal is not available for the PDSCH-to-RE mapping.

According to yet another aspect of the present disclosure, a wireless device configured to communicate with a network node is provided. The wireless device includes processing circuitry. The processing circuitry is configured to cause the wireless device to receive an indication from a network node, the indication indicating whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal. The processing circuitry is configured to cause the wireless device to receive the PDSCH based on the indication, the PDSCH being one of mapped and not mapped to the at least one RE associated with the reference signal based on the indication.

In some embodiments of this aspect, the processing circuitry is further configured to cause the wireless device to receive the PDSCH based on the indication by being configured to cause the wireless device to decode the PDSCH assuming that the PDSCH is mapped to the at least one RE in the same OFDM symbol as the reference signal if the indication indicates that the at least one RE associated with the reference signal is available for the PDSCH-to-RE mapping; and decode the PDSCH assuming that the PDSCH is not mapped to the at least one RE in the same OFDM symbol as the reference signal if the indication indicates that the at least one RE associated with the reference signal is not available for the PDSCH-to-RE mapping.

In some embodiments of this aspect, the processing circuitry is further configured to cause the wireless device to receive the PDSCH based on the indication by being configured to cause the wireless device to perform the PDSCH-to-RE mapping using rate-matching around at least one RE of the reference signal; and if the indication indicates that the at least one RE associated with the reference signal is not available for the PDSCH-to-RE mapping, additionally rate-match around the at least one RE associated with the reference signal that is in the same OFDM symbol as the reference signal and in a frequency of the PDSCH. In some embodiments of this aspect, the processing circuitry is further configured to cause the wireless device to receive scheduling of the PDSCH in resources that overlap resources for the reference signal including the at least one RE associated with the reference signal; and receive the PDSCH-based on the indication by being configured to rate-match the PDSCH according to the PDSCH-to-RE mapping in which the scheduled PDSCH is one of mapped and not mapped to the at least one RE associated with the reference signal based on the indication.

In some embodiments of this aspect, the at least one RE is in a frequency of the PDSCH for the wireless device. In some embodiments of this aspect, the at least one RE is further associated with the reference signal by being in at least one resource block of the reference signal. In some embodiments of this aspect, the reference signal includes one or more of: a reference signal that is not directly associated with a PDSCH transmission; a non-zero power channel state information reference signal, NZP CSI-RS; and an NZP CSI-RS used as a tracking reference signal. In some embodiments of this aspect, the processing circuitry is further configured to cause the wireless device to receive the indication from the network node by being configured to cause the wireless device to receive the indication indicating whether the at least one RE associated with the reference signal is one of available and not available for the PDSCH-to-RE mapping in a radio resource control, RRC, signaling.

In some embodiments of this aspect, the processing circuitry is further configured to cause the wireless device to receive the indication from the network node by being configured to cause the wireless device to receive the indication indicating whether the at least one RE associated with the reference signal is one of available and not available for the PDSCH-to-RE mapping in at least one of a medium access control, MAC, control elements, CE, signaling and a downlink control information, DCI. In some embodiments of this aspect, if the PDSCH demodulation reference signal, DMRS, is quasi collocated, QCL, Type D with the reference signal, determine that the at least one RE associated with the reference signal is available for the PDSCH-to-RE mapping; and if the PDSCH DMRS is not QCL Type D with the reference signal, determine that the at least one RE associated with the reference signal is not available for the PDSCH-to-RE mapping. In some embodiments, the processing circuitry is further configured to cause the wireless device to receive the PDSCH based on the indication by being configured to cause the wireless device to perform a PDSCH-to-RE mapping based on the indication.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 illustrates a resource element grid;

FIG. 2 illustrates an example of a TRS format;

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

DETAILED DESCRIPTION

Figure 3:
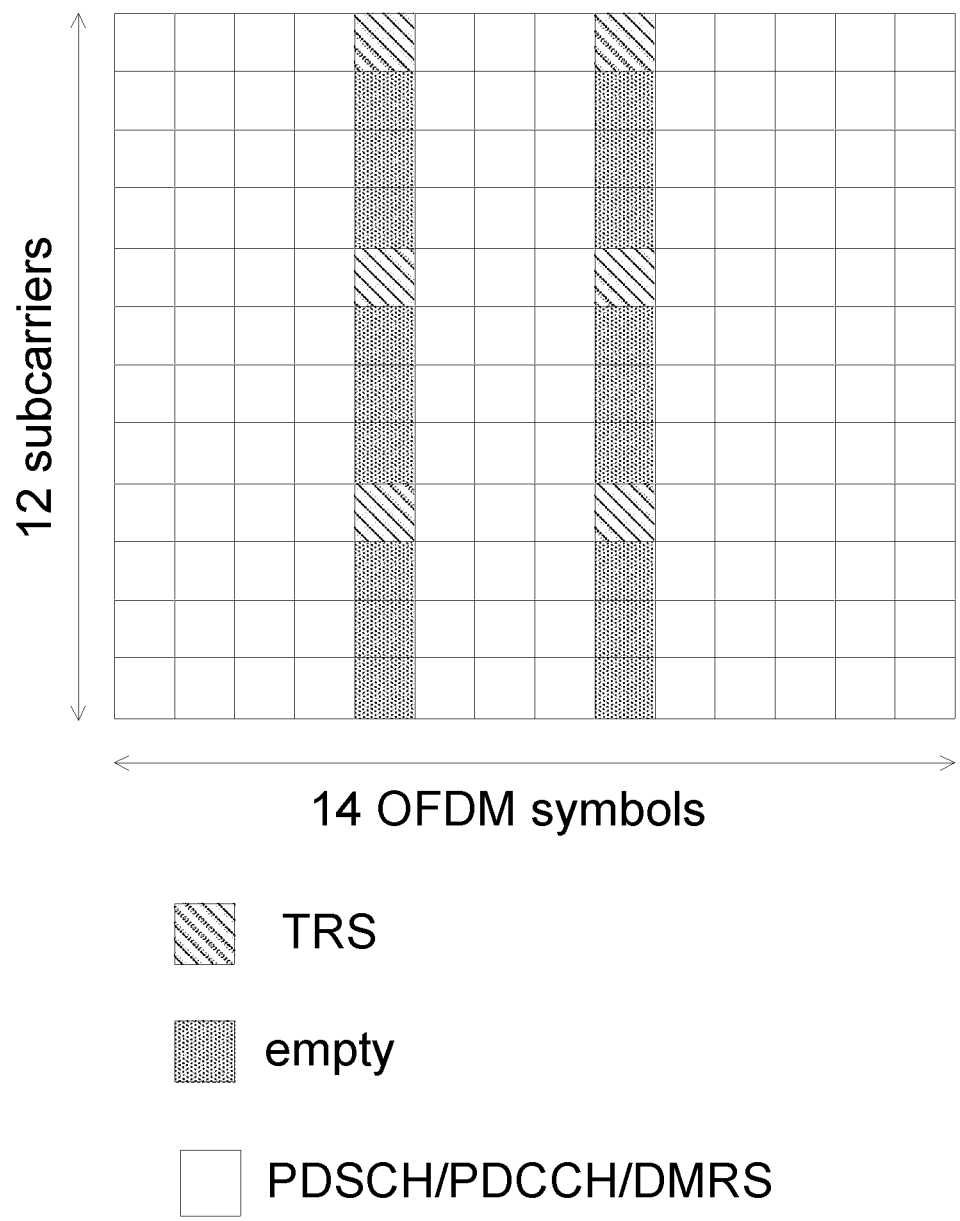
FIG. 3 illustrates a slot of 12 subcarriers and 14 OFDM symbols.

Before describing in detail exemplary embodiments, it is noted that the embodiments reside primarily in combinations of apparatus components and processing steps related to efficient signaling of rate matching patterns. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In some embodiments, the term "rate-matching" is used generally for the transmitter side (e.g., network node) as well as the receiver side (e.g., wireless device) in this disclosure; however, it should be understood that process performed at the receiver side may also be called rate de-matching/de-rate matching. Thus, in some embodiments, the terms rate-matching and rate-dematching may be used herein interchangeably. Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide efficient signaling of rate matching patterns. In NR, it is possible to make arbitrary REs not available for PDSCH-to-RE mapping, by the use of reserved resources and ZP CSI-RS. However, there are cases when it is useful if an OFDM symbol only contains the configured reference signal (RS) and all other REs are empty. One example is the use of IFDMA for beam related measurements, since the frequency domain pattern of using every nth RE and all other empty REs translates into a repetitive waveform in the time domain OFDM symbol. Another use case is when beam based operation is used, then TRS may be transmitted periodically, and in every beam (up to 64 beams in the network). Hence, an OFDM symbol used to transmit TRS in a certain beam direction may not be used for PDSCH transmission in another beam direction. So, if the PDSCH is scheduled in such a slot, a large number of ZP CSI-RS may be configured to make remaining REs in TRS symbols not available for PDSCH mapping.

If the RS is sparse in this case, a large number of ZP CSI-RS may be configured to make the remaining resources not available. In FIG. 3, a slot of 12 subcarriers and 14 OFDM symbols is shown. The diagonal hatched resources indicate a TRS, whereas the clear/white resources in columns not including the diagonal hatched resources can be used for the PDSCH, the physical downlink control channel (PDCCH) and associated demodulation reference signals (DMRS), transmitted in a beam direction A. The two OFDM symbols containing TRS are transmitted in another beam direction and since time domain or analog beamforming is used, the remaining 9 resource elements (dotted hatched resources) in each symbol containing TRS should be empty. Hence, there may be a need to configure up to 18 ZP CSI-RS resources to indicate to the WD that these RE are empty and the PDSCH is not mapped to these REs.

This problem may be solved by some embodiments, where massive ZP CSI-RS configurations are not used. Instead, when configuring the reference signal (e.g., the TRS), the network node signals the WD whether the WD may assume that the remaining, associated REs in the same OFDM symbols are available or not available for PDSCH-to-RE mapping. By this, there may be no need to utilize an excessive number of ZP CSI-RS.

Figure 4:
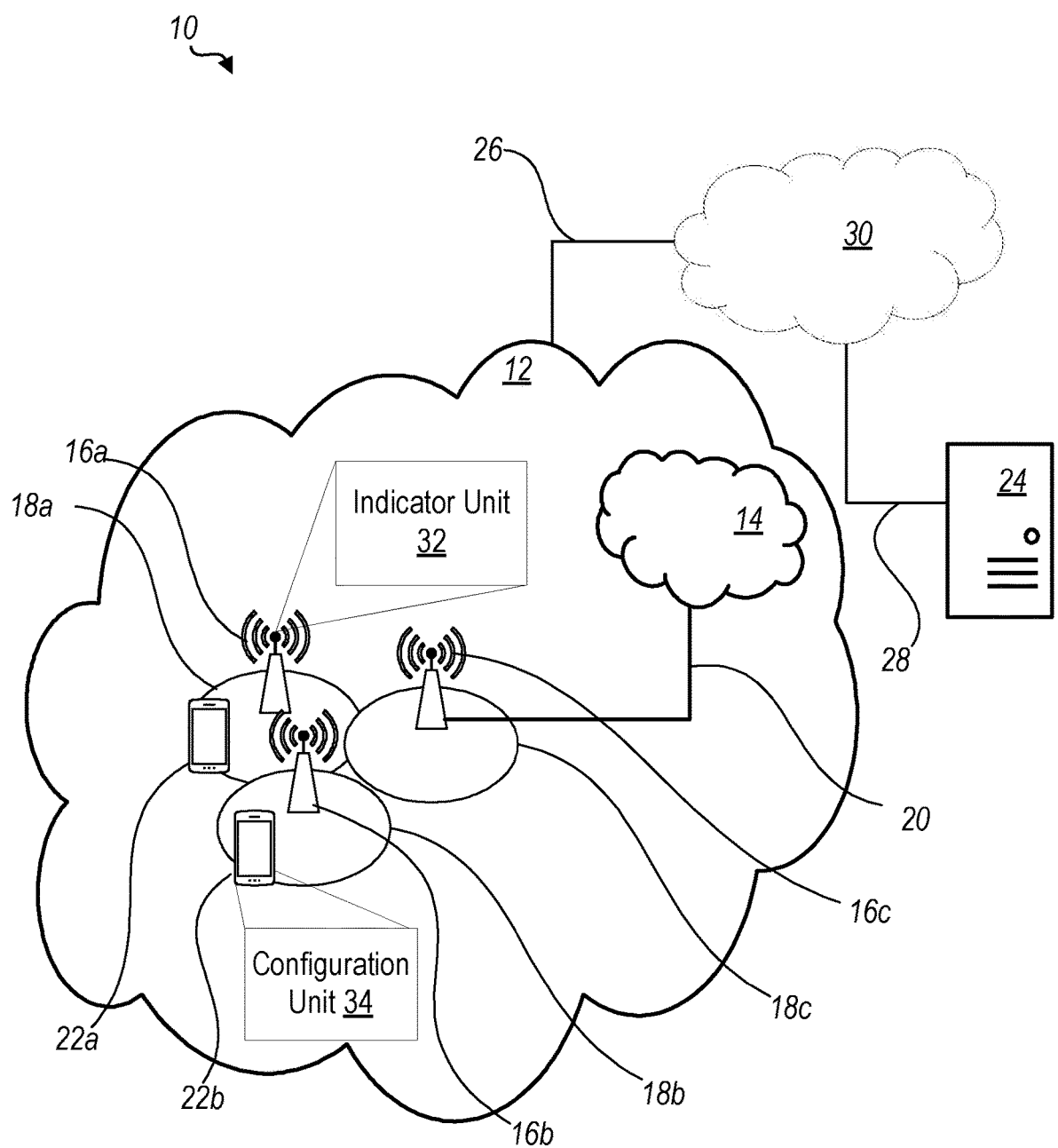
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 may not need to be aware of the future routing of an outgoing uplink communication originating from the WD 22a towards the host computer 24.

A network node 16 is configured to include an indicator unit 32 which is configured to indicate to a wireless device 22 whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal; and/or cause the network node 16 to transmit signaling according to the PDSCH-to-RE mapping, the PDSCH being one of mapped and not mapped to the at least one RE associated with the reference signal based on the indication. In some embodiments, the network node 16 includes an indicator unit 32 which is configured to indicate whether the WD 22 is to assume that remaining associated resource elements, REs, in same orthogonal frequency division multiplex, OFDM, symbols are available or not available for physical downlink shared channel, PDSCH-to-RE mapping based at least in part on REs of the configured reference signal.

In some embodiments, a wireless device 22 is configured to include a configuration unit 34 which is configured to cause the wireless device 22 to receive an indication from a network node 16, the indication indicating whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal; and/or cause the wireless device 22 to perform the PDSCH-to-RE mapping based on the indication, the PDSCH being one of mapped and not mapped to the at least one RE associated with the reference signal based on the indication. In some embodiments, the wireless device 22 includes a configuration unit 34 which is configured to assume that the remaining associated REs are available or not available according to an indication from the network node.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16, such as for example the processes described with reference to the flowchart in FIG. 10 as well as the other figures. For example, processing circuitry 68 of the network node 16 may include indicator unit 32 which is configured to indicate whether the WD 22 is to assume that remaining associated resource elements, REs, in same orthogonal frequency division multiplex, OFDM, symbols are available or not available for physical downlink shared channel, PDSCH-to-RE mapping based at least in part on REs of the configured reference signal.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22, such as for example the processes described with reference to the flowchart in FIG. 11 as well as the other figures. For example, the processing circuitry 84 of the wireless device 22 may include configuration unit 34 which is configured to assume that the remaining associated REs are available or not available according to an indication from the network node.

Figure 5:
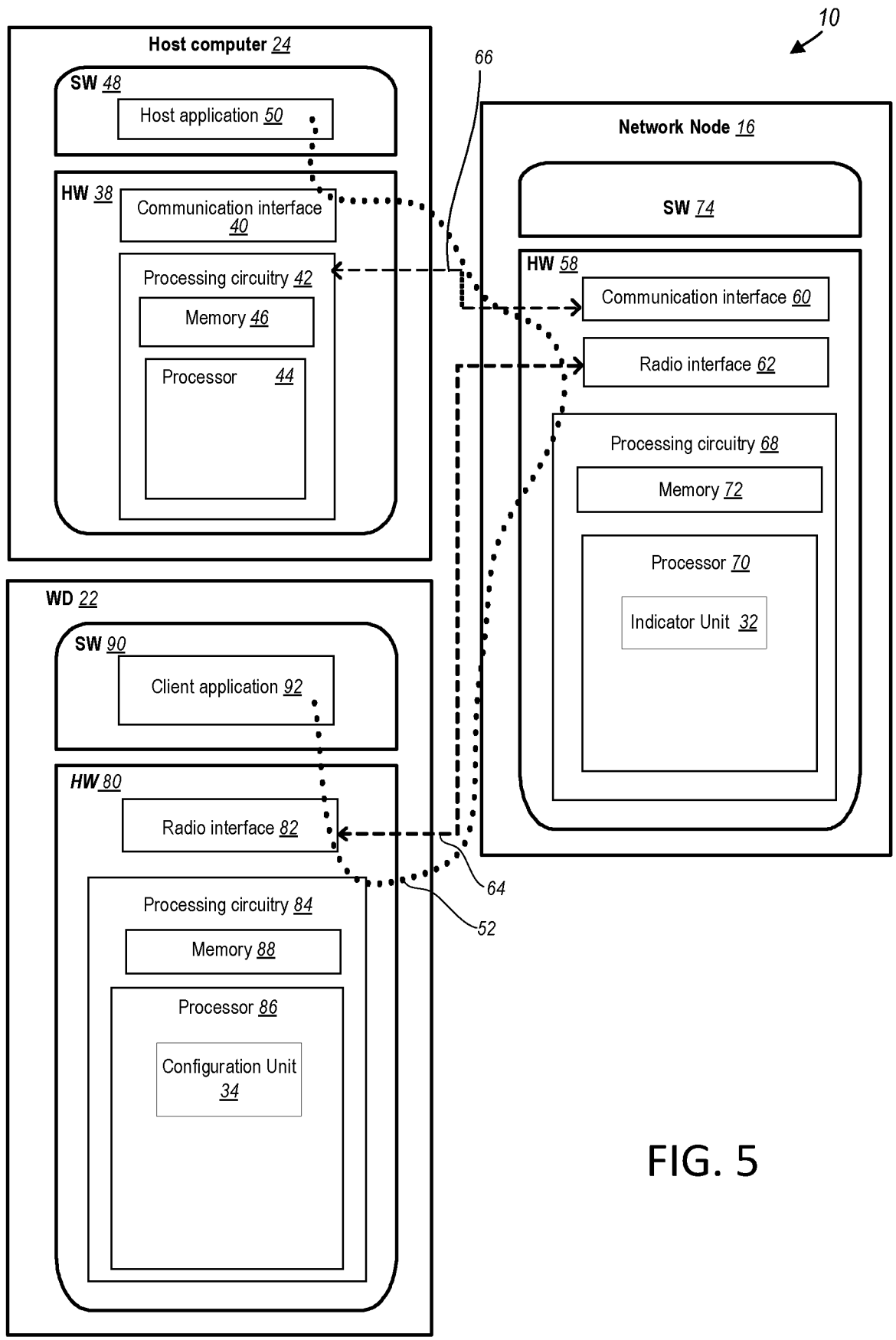
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring may not affect the network node 16, and it may be unknown or imperceptible to the network node 16.

Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as indicator unit 32, and configuration unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
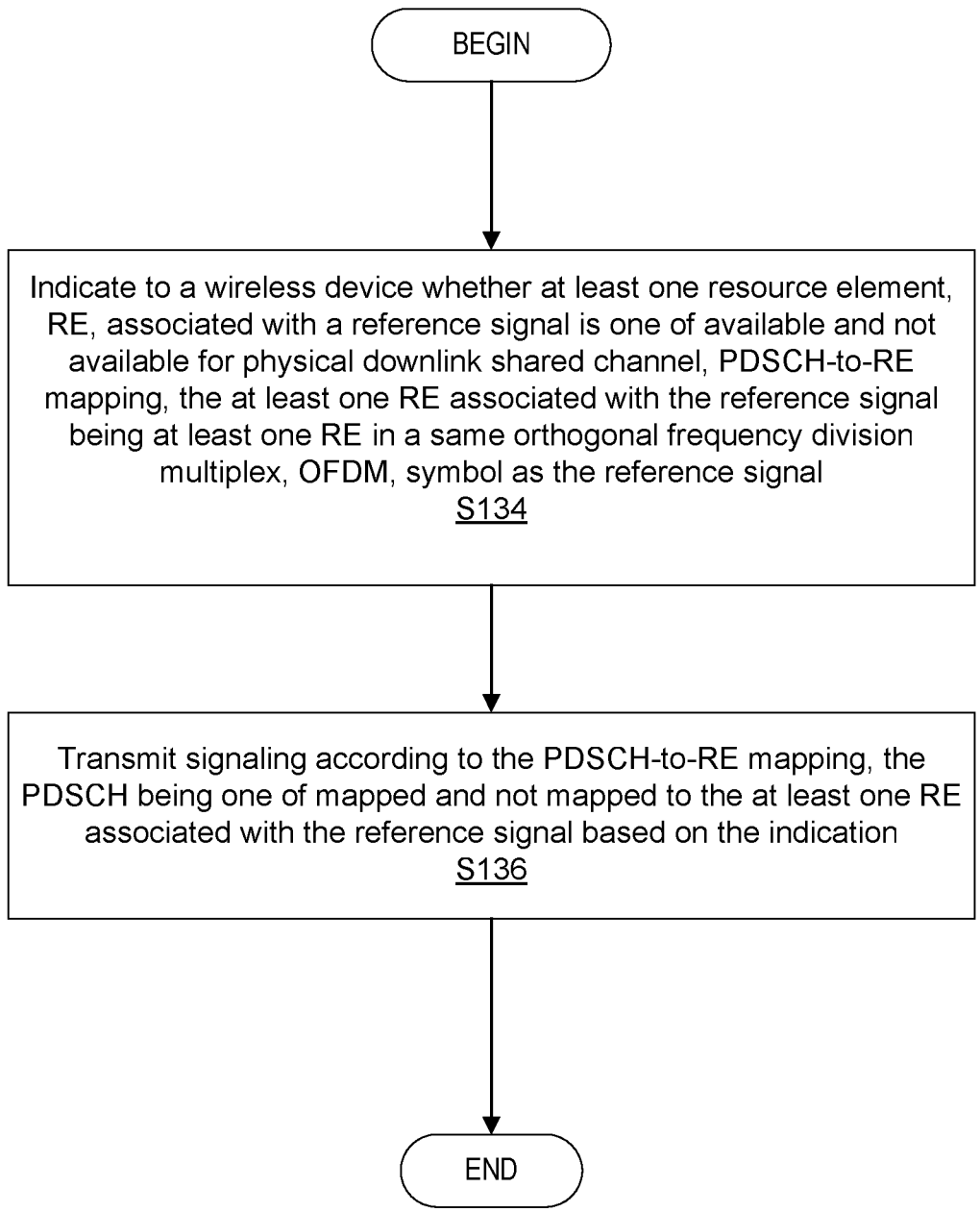
FIG. 10 is a flowchart of an exemplary process in a network node according to some embodiments of the present disclosure for efficient signaling of rate matching patterns.

FIG. 10 is a flowchart of an exemplary process in a network node 16 for efficient signaling of rate matching patterns. One or more blocks described herein may be performed by one or more elements of network node 16 such as by one or more of processing circuitry 68 (including the indicator unit 32), processor 70, radio interface 62 and/or communication interface 60. The example process in a network node 16 may include indicating (Block S134), such as via processing circuitry 68, indicator unit 32, processor 70, radio interface 62 and/or communication interface 60, to a wireless device 22 whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal. The process may include transmitting (Block S136), such as via processing circuitry 68, indicator unit 32, processor 70, radio interface 62 and/or communication interface 60, signaling according to the PDSCH-to-RE mapping, the PDSCH being one of mapped and not mapped to the at least one RE associated with the reference signal based on the indication.

In some embodiments, transmitting, such as via processing circuitry 68, indicator unit 32, processor 70, radio interface 62 and/or communication interface 60, signaling according to the PDSCH-to-RE mapping further includes transmitting the reference signal in the OFDM symbol, the PDSCH being mapped to the at least one RE in the same OFDM symbol as the reference signal if the indication indicates that the at least one RE associated with the reference signal is available for the PDSCH-to-RE mapping, and the PDSCH not being mapped to the at least one RE in the same OFDM symbol as the reference signal if the indication indicates that the at least one RE associated with the reference signal is not available for the PDSCH-to-RE mapping.

In some embodiments, the method further includes scheduling, such as via processing circuitry 68, indicator unit 32, processor 70, radio interface 62 and/or communication interface 60, the PDSCH in resources that overlap resources for the reference signal including the at least one RE associated with the reference signal. In some embodiments, transmitting signaling according to the PDSCH-to-RE mapping further includes transmitting, such as via processing circuitry 68, indicator unit 32, processor 70, radio interface 62 and/or communication interface 60, the PDSCH according to the PDSCH-to-RE mapping in which the scheduled PDSCH is one of mapped and not mapped to the at least one RE associated with the reference signal based on the indication.

In some embodiments, the at least one RE is in a frequency of the PDSCH for the wireless device. In some embodiments, the at least one RE is further associated with the reference signal by being in at least one resource block of the reference signal. In some embodiments, the reference signal includes one or more of: a reference signal that is not directly associated with a PDSCH transmission; a non-zero power channel state information reference signal, NZP CSI-RS; and an NZP CSI-RS used as a tracking reference signal. In some embodiments, indicating to the wireless device 22 further includes indicating, such as via processing circuitry 68, indicator unit 32, processor 70, radio interface 62 and/or communication interface 60, whether the at least one RE associated with the reference signal is one of available and not available for the PDSCH-to-RE mapping in a radio resource control, RRC, signaling. In some embodiments, indicating to the wireless device further includes indicating whether the at least one RE associated with the reference signal is one of available and not available for the PDSCH-to-RE mapping in at least one of a medium access control, MAC, control elements, CE, signaling and a downlink control information, DCI.

In some embodiments, if the PDSCH demodulation reference signal, DMRS, is quasi collocated, QCL, Type D with the reference signal, determine that the at least one RE associated with the reference signal is available for the PDSCH-to-RE mapping; and if the PDSCH DMRS is not QCL Type D with the reference signal, determine that the at least one RE associated with the reference signal is not available for the PDSCH-to-RE mapping.

In some embodiments, network node 16 such as via processing circuitry 68 and/or processor 70 and/or radio interface 62 and/or communication interface 60 is configured to configure a reference signal. The process further includes signaling the WD to indicate whether the WD is to assume that remaining associated resource elements, REs, in same orthogonal frequency division multiplex, OFDM, symbols are available or not available for physical downlink shared channel, PDSCH-to-RE mapping based at least in part on REs of the configured reference signal.

Figure 11:
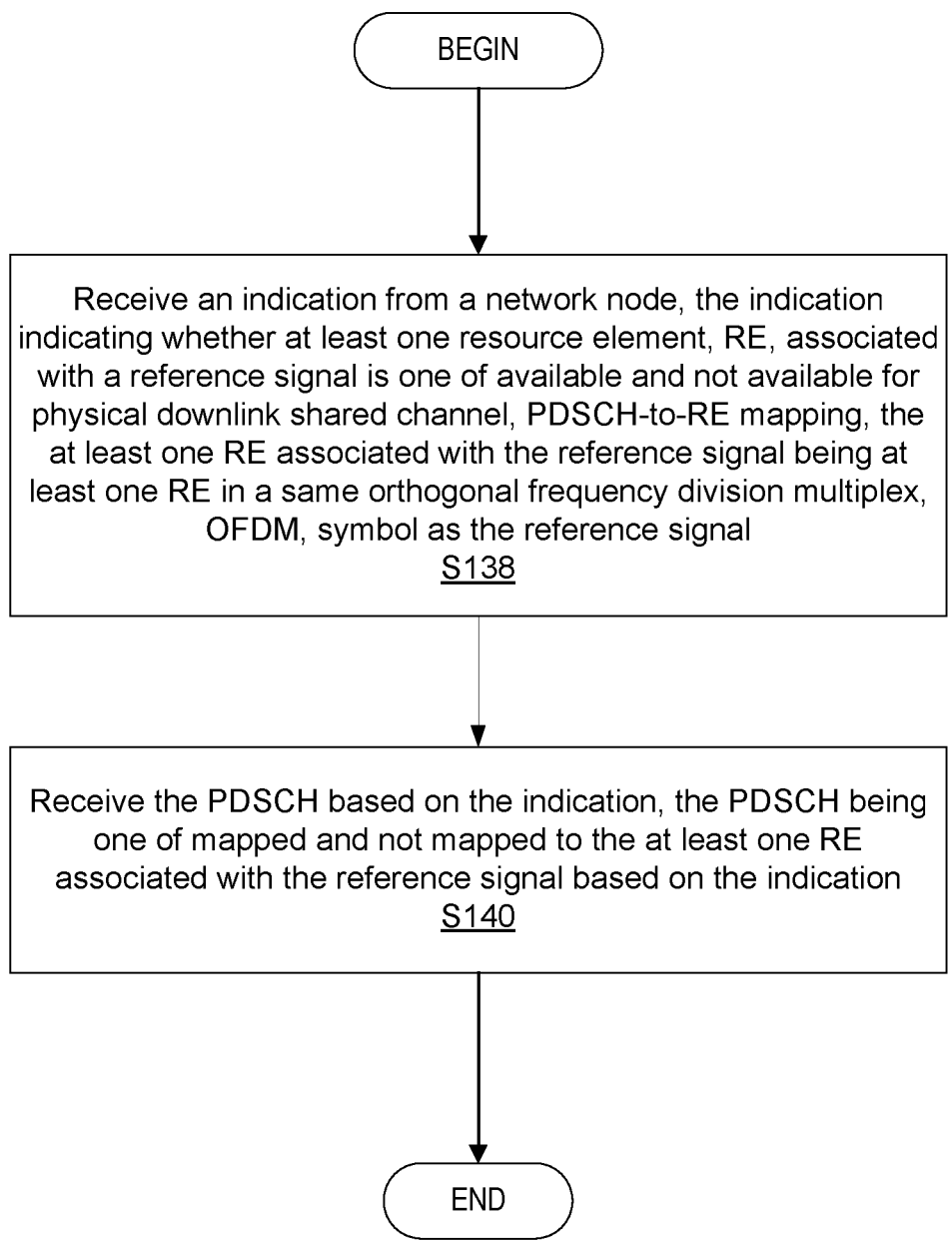
FIG. 11 is a flowchart of an exemplary process in a wireless device according to some embodiments of the present disclosure for efficient signaling of rate matching patterns.

FIG. 11 is a flowchart of an exemplary process in a wireless device 22 according to some embodiments of the present disclosure for efficient signaling of rate matching patterns. One or more blocks described herein may be performed by one or more elements of wireless device 22 such as by one or more of processing circuitry 84 (including the configuration unit 34), processor 86 and/or radio interface 82. In some embodiments, the exemplary process includes receiving (Block S138), such as via processing circuitry 84, configuration unit 34, processor 86 and/or radio interface 82, an indication from a network node 16, the indication indicating whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal. The process may include receiving (Block S140), such as via processing circuitry 84, configuration unit 34, processor 86 and/or radio interface 82, the PDSCH based on the indication, the PDSCH being one of mapped and not mapped to the at least one RE associated with the reference signal based on the indication.

In some embodiments, receiving the PDSCH based on the indication further includes decoding, such as via processing circuitry 84, configuration unit 34, processor 86 and/or radio interface 82, the PDSCH assuming that the PDSCH is mapped to the at least one RE in the same OFDM symbol as the reference signal if the indication indicates that the at least one RE associated with the reference signal is available for the PDSCH-to-RE mapping; and decoding, such as via processing circuitry 84, configuration unit 34, processor 86 and/or radio interface 82, the PDSCH assuming that the PDSCH is not mapped to the at least one RE in the same OFDM symbol as the reference signal if the indication indicates that the at least one RE associated with the reference signal is not available for the PDSCH-to-RE mapping. In some embodiments, the decoding the PDSCH by assuming that the PDSCH is mapped to the at least one RE in the same OFDM symbol as the reference signal (if the indication indicates that the at least one RE associated with the reference signal is available for the PDSCH-to-RE mapping) further comprises decoding the PDSCH by including the received information (e.g., as part of the PDSCH) in the at least one RE in the same OFDM symbol as the reference signal (if the indication indicates that the at least one RE associated with the reference signal is available for the PDSCH-to-RE mapping). In some embodiments, the decoding the PDSCH by assuming that the PDSCH is not mapped to the at least one RE in the same OFDM symbol as the reference signal (if the indication indicates that the at least one RE associated with the reference signal is not available for the PDSCH-to-RE mapping) further comprises decoding the PDSCH by excluding received information (e.g., from the PDSCH) in the at least one RE in the same OFDM symbol as the reference signal (if the indication indicates that the at least one RE associated with the reference signal is not available for the PDSCH-to-RE mapping).

In some embodiments, receiving the PDSCH based on the indication further includes performing, such as via processing circuitry 84, configuration unit 34, processor 86 and/or radio interface 82, the PDSCH-to-RE mapping using rate-matching around at least one RE of the reference signal; and if the indication indicates that the at least one RE associated with the reference signal is not available for the PDSCH-to-RE mapping, additionally rate-matching around the at least one RE associated with the reference signal that is in the same OFDM symbol as the reference signal and in a frequency of the PDSCH. In some embodiments, the method further includes receiving, such as via processing circuitry 84, configuration unit 34, processor 86 and/or radio interface 82, scheduling of the PDSCH in resources that overlap resources for the reference signal including the at least one RE associated with the reference signal; and receiving the PDSCH based on the indication further includes rate-matching the PDSCH according to the PDSCH-to-RE mapping in which the scheduled PDSCH is one of mapped and not mapped to the at least one RE associated with the reference signal based on the indication.

In some embodiments, the at least one RE is in a frequency of the PDSCH for the wireless device 22. In some embodiments, the at least one RE is further associated with the reference signal by being in at least one resource block of the reference signal. In some embodiments, the reference signal includes one or more of: a reference signal that is not directly associated with a PDSCH transmission; a non-zero power channel state information reference signal, NZP CSI-RS; and an NZP CSI-RS used as a tracking reference signal. In some embodiments, receiving the indication from the network node 16 further includes receiving, such as via processing circuitry 84, configuration unit 34, processor 86 and/or radio interface 82, the indication indicating whether the at least one RE associated with the reference signal is one of available and not available for the PDSCH-to-RE mapping in a radio resource control, RRC, signaling.

In some embodiments, receiving the indication from the network node 16 further includes receiving, such as via processing circuitry 84, configuration unit 34, processor 86 and/or radio interface 82, the indication indicating whether the at least one RE associated with the reference signal is one of available and not available for the PDSCH-to-RE mapping in at least one of a medium access control, MAC, control elements, CE, signaling and a downlink control information, DCI. In some embodiments, the method further includes if the PDSCH demodulation reference signal, DMRS, is quasi collocated, QCL, Type D with the reference signal, determining that the at least one RE associated with the reference signal is available for the PDSCH-to-RE mapping; and if the PDSCH DMRS is not QCL Type D with the reference signal, determining that the at least one RE associated with the reference signal is not available for the PDSCH-to-RE mapping.

In some embodiments, wireless device 22 such as via processing circuitry 84 and/or processor 86 and/or radio interface 82 is configured to receive an indication from the network node whether the WD is to assume that remaining associated resource elements, REs, in same orthogonal frequency division multiplex, OFDM, symbols are available or not available for physical downlink shared channel, PDSCH-to-RE mapping. The process also includes assuming that the remaining associated REs are available or not available according to the indication. In some embodiments, receiving the PDSCH based on the indication further includes performing a PDSCH-to-RE mapping based on the indication.

Having described the general process flow of arrangements of the disclosure and having provided examples of hardware and software arrangements for implementing the processes and functions of the disclosure, the sections below provide details and examples of arrangements for efficient signaling of rate matching patterns.

In some embodiments, if the network (e.g., network node 16) signals to the WD 22 to do so, the WD 22, via the processor 86, performs PDSCH-to-RE mapping using rate-matching around the REs of the configured non-zero power reference signal (e.g., the TRS) and additionally around associated REs that are associated with the configured reference signal.

In some embodiments, the reference signals are not directly associated with the PDSCH transmission (i.e., they are not PDSCH DMRS). Non-limiting examples of such reference signals that are not directly associated with the PDSCH are NZP CSI-RS, or a positioning RS, a TRS (NZP CSI-RS used for tracking) or a LTE CRS or LTE NZP CSI-RS.

The associated REs may be empty, be defined as reserved resources, not available resources or ZP CSI-RS resources.

The indication can occur when performing the configuration of the reference signal, via the processor 70, by using radio resource control (RRC) or medium access control (MAC) control elements (CE) signaling or using downlink control information (DCI).

In a related embodiment, the WD 22 is signaled, via the radio interface 62, the description of the associated REs.

In another embodiment, the associated REs are the remaining REs in the same OFDM symbols as the reference signal (i.e., REs not used by the reference signal).

In yet another embodiment, the associated REs are the remaining REs in the same OFDM symbol over the frequency span (i.e., the occupied resource blocks) of the reference signal.

In yet another embodiment, if the WD 22 is scheduled, via the network node 16, a PDSCH that overlaps with the reference signal in one or more OFDM symbols, and the PDSCH DMRS is quasi collocated (QCL) Type D with the reference signal, then the associated REs in the OFDM symbol are available for PDSCH mapping, otherwise, the associated REs in the OFDM symbol are not available for PDSCH mapping to these REs.

An example is the case when the reference signal is a TRS. If the TRS beam is the same as the PDSCH beam (i.e., reference signal and PDSCH DMRS are QCL Type D associated), then PDSCH can be mapped to the REs not used by TRS REs. But if they are not QCL Type D, then the TRS beam is in another direction compared to the PDSCH beam and in this case, the PDSCH should not be mapped to the associated REs since they would then point in the wrong beam direction (assuming the transmitter can only point an OFDM symbol in one beam direction at a time, which is typical when time domain beamforming/analog beamforming is used).

Figure 12:
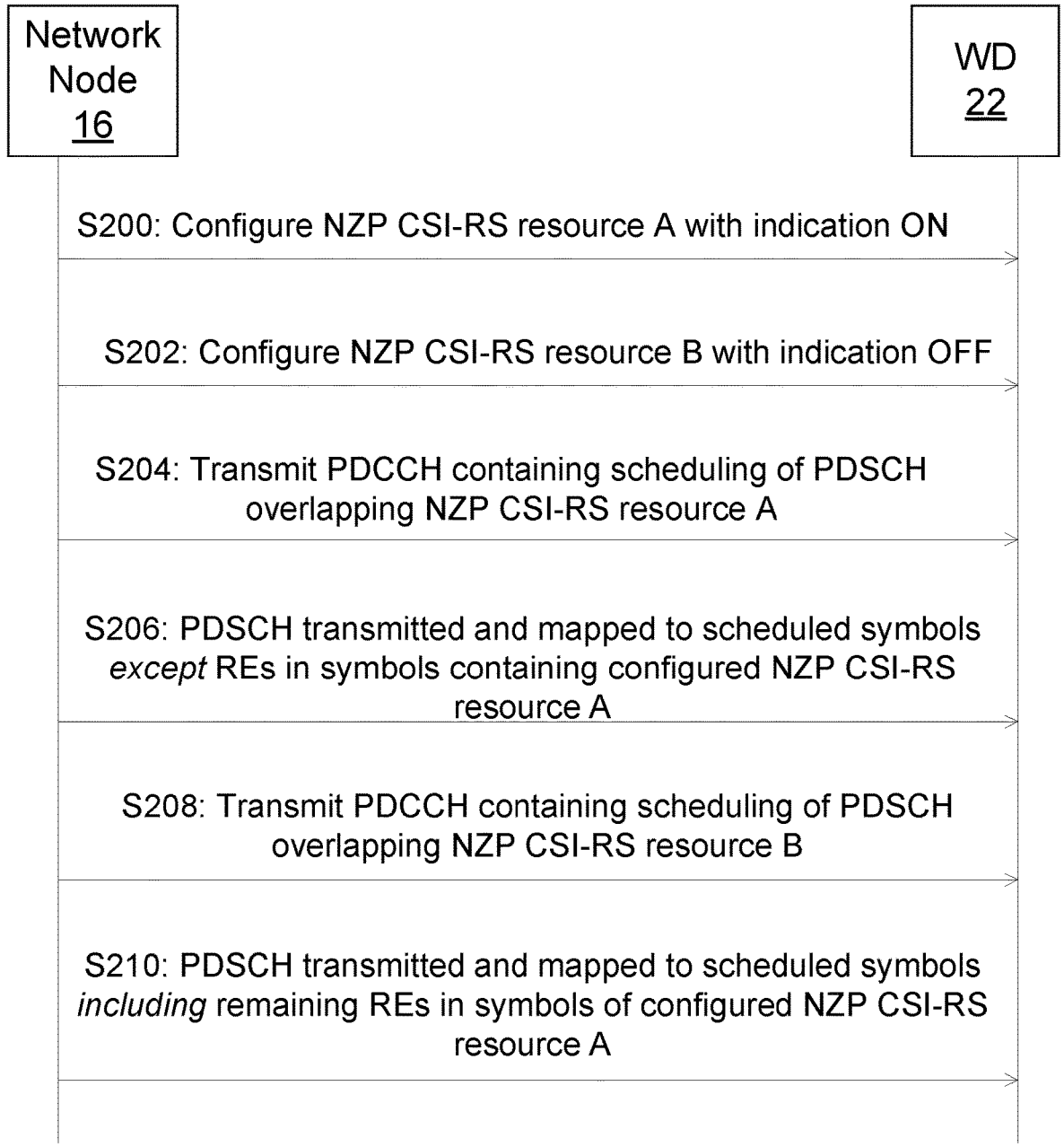
FIG. 12 is a flowchart showing signaling between a network node and a WD for signaling of rate matching patterns.

In FIG. 12, an example handshake diagram is shown where the WD 22 is configured with two NZP CSI-RS resources A and B, in steps S200 and S202, and when the WD 22 is scheduled a PDSCH that overlaps with resource A (as in step S204), the WD 22 assumes (e.g., in its decoding/receiving of the PDSCH) in step S206 that the PDSCH is not mapped to the remaining RE in the OFDM symbols of resource A (e.g., since the indication is ON for resource A). If the WD 22 is scheduled a PDSCH that overlaps with resource B (as in step S208), then the WD 22 assumes (e.g., in its decoding/receiving of PDSCH) in step S210 that PDSCH is mapped to the remaining REs in the OFDM symbols of resource B (e.g., since the indication is OFF for resource B).

Thus, according to one aspect, a network node 16 is configured to configure a reference signal and then signal the WD 22 to indicate whether the WD 22 is to assume that remaining associated resource elements, REs, in same orthogonal frequency division multiplex, OFDM, symbols are available or not available for physical downlink shared channel, PDSCH-to-RE mapping based at least in part on REs of the configured reference signal.

According to this aspect, in some embodiments, the reference signal is not directly associated with a PDSCH transmission. In some embodiments, the processing circuitry is further configured to signal to the WD 22 a description of REs associated with the reference signal.

According to another aspect, a wireless device 22 is configured to receive an indication from the network node 16 whether the WD 22 is to assume (e.g., decode PDSCH assuming) that remaining associated resource elements, REs, in the same orthogonal frequency division multiplex, OFDM, symbols are available or not available for physical downlink shared channel, PDSCH-to-RE mapping. The wireless device 22 may be configured to assume (e.g., decode PDSCH assuming) that the remaining associated REs are available or not available according to the indication.

According to this aspect, in some embodiments, the wireless device 22 is further configured to perform PDSCH-to-RE mapping using rate-matching around REs of a configured non-zero power reference signal and additionally around associated REs that are associated with a configured reference signal.

Some embodiments may include one or more of the following:

Embodiment A1. A network node configured to communicate with a wireless device (WD), the network node configured to, and/or comprising a radio interface and/or comprising processing circuitry configured to:

configure a reference signal; and signal the WD to indicate whether the WD is to assume that remaining associated resource elements, REs, in same orthogonal frequency division multiplex, OFDM, symbols are available or not available for physical downlink shared channel, PDSCH-to-RE mapping based at least in part on REs of the configured reference signal.

Embodiment A2. The network node of Embodiment A1, wherein the reference signal is not directly associated with a PDSCH transmission.

Embodiment A3. The network node of Embodiment A1, wherein the processing circuitry is further configured to signal to the WD a description of REs associated with the reference signal.

Embodiment B1. A method implemented in a network node, the method comprising:

configuring a reference signal; and signaling the WD to indicate whether the WD is to assume that remaining associated resource elements, REs, in same orthogonal frequency division multiplex, OFDM, symbols are available or not available for physical downlink shared channel, PDSCH-to-RE mapping based at least in part on REs of the configured reference signal.

Embodiment B2. The method of Embodiment B1, wherein the reference signal is not directly associated with a PDSCH transmission.

Embodiment B3. The method of Embodiment B1, wherein the processing circuitry is further configured to signal to the WD a description of REs associated with the reference signal.

Embodiment C1. A wireless device (WD) configured to communicate with a network node, the WD configured to, and/or comprising a radio interface and/or processing circuitry configured to:

receive an indication from the network node whether the WD is to assume that remaining associated resource elements, REs, in same orthogonal frequency division multiplex, OFDM, symbols are available or not available for physical downlink shared channel, PDSCH-to-RE mapping; and assume that the remaining associated REs are available or not available according to the indication.

Embodiment C2. The wireless device of Embodiment C1, further comprising performing PDSCH-to-RE mapping using rate-matching around REs of a configured non-zero power reference signal and additionally around associated REs that are associated with a configured reference signal.

Embodiment D1. A method implemented in a wireless device (WD), the method comprising:

receiving an indication from the network node whether the WD is to assume that remaining associated resource elements, REs, in same orthogonal frequency division multiplex, OFDM, symbols are available or not available for physical downlink shared channel, PDSCH-to-RE mapping; and assuming that the remaining associated REs are available or not available according to the indication.

Embodiment D2. The method of Embodiment D1, further comprising performing PDSCH-to-RE mapping using rate-matching around REs of a configured non-zero power reference signal and additionally around associated REs that are associated with a configured reference signal.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:
indicating to a wireless device whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal;
transmitting signaling according to the PDSCH-to-RE mapping, the PDSCH being one of mapped and not mapped to the at least one RE associated with the reference signal based on the indication, the reference signal being an NZP CSI-RS used as a tracking reference signal;
if the PDSCH demodulation reference signal, DMRS, is quasi collocated, QCL, Type D with the reference signal, the at least one RE associated with the reference signal is available for the PDSCH-to-RE mapping; and
if the PDSCH DMRS is not QCL Type D with the reference signal, the at least one RE associated with the reference signal is not available for the PDSCH-to-RE mapping.

2. The method of claim 1, wherein transmitting signaling according to the PDSCH-to-RE mapping further comprises:
transmitting the reference signal in the OFDM symbol, the PDSCH being mapped to the at least one RE in the same OFDM symbol as the reference signal if the indication indicates that the at least one RE associated with the reference signal is available for the PDSCH-to-RE mapping, and the PDSCH not being mapped to the at least one RE in the same OFDM symbol as the reference signal if the indication indicates that the at least one RE associated with the reference signal is not available for the PDSCH-to-RE mapping.

3. The method of claim 1, further comprising:
scheduling the PDSCH in resources that overlap resources for the reference signal including the at least one RE associated with the reference signal; and
wherein transmitting signaling according to the PDSCH-to-RE mapping further comprises transmitting the PDSCH according to the PDSCH-to-RE mapping in which the scheduled PDSCH is one of mapped and not mapped to the at least one RE associated with the reference signal based on the indication.

4. A method implemented in a wireless device, the method comprising:
receiving an indication from a network node, the indication indicating whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal;
receiving a PDSCH based on the indication, the PDSCH being one of mapped and not mapped to the at least one RE associated with the reference signal based on the indication, the reference signal being an NZP CSI-RS used as a tracking reference signal;
if the PDSCH demodulation reference signal, DMRS, is quasi collocated, QCL, Type D with the reference signal, the at least one RE associated with the reference signal is available for the PDSCH-to-RE mapping; and
if the PDSCH DMRS is not QCL Type D with the reference signal, the at least one RE associated with the reference signal is not available for the PDSCH-to-RE mapping.

5. The method of claim 4, wherein receiving the PDSCH based on the indication further comprises:
decoding the PDSCH assuming that the PDSCH is mapped to the at least one RE in the same OFDM symbol as the reference signal if the indication indicates that the at least one RE associated with the reference signal is available for the PDSCH-to-RE mapping; and
decoding the PDSCH assuming that the PDSCH is not mapped to the at least one RE in the same OFDM symbol as the reference signal if the indication indicates that the at least one RE associated with the reference signal is not available for the PDSCH-to-RE mapping.

6. The method of claim 4, wherein receiving the PDSCH based on the indication further comprises:
performing the PDSCH-to-RE mapping using rate-matching around at least one RE of the reference signal; and
if the indication indicates that the at least one RE associated with the reference signal is not available for the PDSCH-to-RE mapping, additionally rate-matching around the at least one RE associated with the reference signal that is in the same OFDM symbol as the reference signal and in a frequency of the PDSCH.

7. The method of claim 4, further comprising:
receiving scheduling of the PDSCH in resources that overlap resources for the reference signal including the at least one RE associated with the reference signal; and
wherein receiving the PDSCH based on the indication further comprises rate-matching the PDSCH according to the PDSCH-to-RE mapping in which the scheduled PDSCH is one of mapped and not mapped to the at least one RE associated with the reference signal based on the indication.

8. A network node configured to communicate with a wireless device, the network node comprising processing circuitry, the processing circuitry configured to cause the network node to:
indicate to a wireless device whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal;
transmit signaling according to the PDSCH-to-RE mapping, the PDSCH being one of mapped and not mapped to the at least one RE associated with the reference signal based on the indication, the reference signal being an NZP CSI-RS used as a tracking reference signal;
if the PDSCH demodulation reference signal, DMRS, is quasi collocated, QCL, Type D with the reference signal, the at least one RE associated with the reference signal is available for the PDSCH-to-RE mapping; and
if the PDSCH DMRS is not QCL Type D with the reference signal, the at least one RE associated with the reference signal is not available for the PDSCH-to-RE mapping.

9. The network node of claim 8, wherein the processing circuitry is further configured to cause the network node to transmit signaling according to the PDSCH-to-RE mapping by being configured to:
transmit the reference signal in the OFDM symbol, the PDSCH being mapped to the at least one RE in the same OFDM symbol as the reference signal if the indication indicates that the at least one RE associated with the reference signal is available for the PDSCH-to-RE mapping, and the PDSCH not being mapped to the at least one RE in the same OFDM symbol as the reference signal if the indication indicates that the at least one RE associated with the reference signal is not available for the PDSCH-to-RE mapping.

10. The network node of claim 8, wherein the processing circuitry is further configured to cause the network node to:
schedule the PDSCH in resources that overlap resources for the reference signal including the at least one RE associated with the reference signal; and
transmit signaling according to the PDSCH-to-RE mapping by being configured to transmit the PDSCH according to the PDSCH-to-RE mapping in which the scheduled PDSCH is one of mapped and not mapped to the at least one RE associated with the reference signal based on the indication.

11. The network node of claim 8, wherein the at least one RE is further associated with the reference signal by being in at least one resource block of the reference signal.

12. The network node of claim 8, wherein the processing circuitry is further configured to cause the network node to indicate to the wireless device by being configured to cause the network node to:
  indicate whether the at least one RE associated with the reference signal is one of available and not available for the PDSCH-to-RE mapping in a radio resource control, RRC, signaling.

13. The network node of claim 8, wherein the processing circuitry is further configured to cause the network node to indicate to the wireless device by being configured to cause the network node to:
  indicate whether the at least one RE associated with the reference signal is one of available and not available for the PDSCH-to-RE mapping in at least one of a medium access control, MAC, control elements, CE, signaling and a downlink control information, DCI.

14. A wireless device configured to communicate with a network node, the wireless device comprising processing circuitry, the processing circuitry configured to cause the wireless device to:
  receive an indication from a network node, the indication indicating whether at least one resource element, RE, associated with a reference signal is one of available and not available for physical downlink shared channel, PDSCH-to-RE mapping, the at least one RE associated with the reference signal being at least one RE in a same orthogonal frequency division multiplex, OFDM, symbol as the reference signal;
  receive a PDSCH based on the indication, the PDSCH being one of mapped and not mapped to the at least one RE associated with the reference signal based on the indication, the reference signal being an NZP CSI-RS used as a tracking reference signal;
  if the PDSCH demodulation reference signal, DMRS, is quasi collocated, QCL, Type D with the reference signal, the at least one RE associated with the reference signal is available for the PDSCH-to-RE mapping; and
  if the PDSCH DMRS is not QCL Type D with the reference signal, the at least one RE associated with the reference signal is not available for the PDSCH-to-RE mapping.

15. The wireless device of claim 14, wherein the processing circuitry is further configured to cause the wireless device to receive the PDSCH based on the indication by being configured to cause the wireless device to:
  decode the PDSCH assuming that the PDSCH is mapped to the at least one RE in the same OFDM symbol as the reference signal if the indication indicates that the at least one RE associated with the reference signal is available for the PDSCH-to-RE mapping; and
  decode the PDSCH assuming that the PDSCH is not mapped to the at least one RE in the same OFDM symbol as the reference signal if the indication indicates that the at least one RE associated with the reference signal is not available for the PDSCH-to-RE mapping.

16. The wireless device of claim 14, wherein the processing circuitry is further configured to cause the wireless device to receive the PDSCH based on the indication by being configured to cause the wireless device to:
  perform the PDSCH-to-RE mapping using rate-matching around at least one RE of the reference signal; and
  if the indication indicates that the at least one RE associated with the reference signal is not available for the PDSCH-to-RE mapping, additionally rate-match around the at least one RE associated with the reference signal that is in the same OFDM symbol as the reference signal and in a frequency of the PDSCH.

17. The wireless device of claim 14, wherein the processing circuitry is further configured to cause the wireless device to:
  receive scheduling of the PDSCH in resources that overlap resources for the reference signal including the at least one RE associated with the reference signal; and
  receive the PDSCH based on the indication by being configured to rate-match the PDSCH according to the PDSCH-to-RE mapping in which the scheduled PDSCH is one of mapped and not mapped to the at least one RE associated with the reference signal based on the indication.

18. The wireless device of claim 14, wherein the at least one RE is further associated with the reference signal by being in at least one resource block of the reference signal.

19. The wireless device of claim 14, wherein the processing circuitry is further configured to cause the wireless device to receive the indication from the network node by being configured to cause the wireless device to:
  receive the indication indicating whether the at least one RE associated with the reference signal is one of available and not available for the PDSCH-to-RE mapping in a radio resource control, RRC, signaling.

20. The wireless device of claim 14, wherein the processing circuitry is further configured to cause the wireless device to receive the indication from the network node by being configured to cause the wireless device to:
  receive the indication indicating whether the at least one RE associated with the reference signal is one of available and not available for the PDSCH-to-RE mapping in at least one of a medium access control, MAC, control elements, CE, signaling and a downlink control information, DCI.

* * * * *